United States Patent
O'Mara et al.

(10) Patent No.: US 9,400,974 B2
(45) Date of Patent: Jul. 26, 2016

(54) SYSTEMS AND METHODS FOR ANNOTATING AND SENDING ELECTRONIC DOCUMENTS

(75) Inventors: Neal O'Mara, San Francisco, CA (US); Joseph Walla, San Francisco, CA (US)

(73) Assignee: JN Projects, Inc., San Francisco, CA (US)

( * ) Notice: Subject to any disclaimer, the term of this patent is extended or adjusted under 35 U.S.C. 154(b) by 565 days.

(21) Appl. No.: 13/593,390

(22) Filed: Aug. 23, 2012

(65) Prior Publication Data

US 2013/0061125 A1    Mar. 7, 2013

Related U.S. Application Data

(60) Provisional application No. 61/530,898, filed on Sep. 2, 2011.

(51) Int. Cl.
*G06F 17/00* (2006.01)
*G06Q 10/10* (2012.01)
*G06F 17/24* (2006.01)

(52) U.S. Cl.
CPC .............. *G06Q 10/10* (2013.01); *G06F 17/241* (2013.01)

(58) Field of Classification Search
CPC ..................................................... G06F 17/241
USPC ........................................................ 715/232
See application file for complete search history.

(56) References Cited

U.S. PATENT DOCUMENTS

| | | | | |
|---|---|---|---|---|
| 5,005,200 A * | 4/1991 | Fischer | ............................ | 380/30 |
| 6,336,124 B1 * | 1/2002 | Alam et al. | .................... | 715/205 |
| 7,900,050 B2 * | 3/2011 | Izu et al. | ........................ | 713/176 |
| 8,205,151 B2 * | 6/2012 | Smith | ............................ | 715/236 |
| 2002/0049906 A1 * | 4/2002 | Maruyama et al. | ............ | 713/176 |
| 2004/0054606 A1 * | 3/2004 | Broerman | ........................ | 705/27 |
| 2004/0117280 A1 * | 6/2004 | Klee et al. | ......................... | 705/35 |
| 2005/0055627 A1 * | 3/2005 | Lloyd et al. | .................... | 715/505 |
| 2005/0076215 A1 * | 4/2005 | Dryer | ............................ | 713/170 |
| 2005/0091143 A1 * | 4/2005 | Schmidt et al. | .................. | 705/37 |
| 2005/0177734 A1 * | 8/2005 | Tanimoto et al. | .............. | 713/186 |
| 2007/0094510 A1 * | 4/2007 | Ross et al. | ...................... | 713/178 |
| 2007/0143085 A1 * | 6/2007 | Kimmel | .............................. | 703/3 |
| 2007/0168671 A1 * | 7/2007 | Takenaka et al. | .............. | 713/176 |
| 2007/0198533 A1 * | 8/2007 | Foygel et al. | .................... | 707/10 |
| 2008/0034213 A1 * | 2/2008 | Boemker et al. | .............. | 713/176 |
| 2008/0209313 A1 * | 8/2008 | Gonser | .......................... | 715/255 |
| 2008/0232557 A1 * | 9/2008 | Baird | .......................... | 379/88.13 |

(Continued)

OTHER PUBLICATIONS

Basu, "Send Your Photos to Your Picasa Web Album With an Email", dated: Feb. 27, 2009, pp. 1-4, URL:<http://www.makeuseof.com/tag/sendyourphotostoyourpicasawebalbumwithanemail/>.*

(Continued)

*Primary Examiner* — Mustafa Amin
(74) *Attorney, Agent, or Firm* — Fountainhead Law Group P.C.

(57) ABSTRACT

According to one embodiment, a method is provided that can comprise receiving, by a server computer system from a user operating a client computing device, an electronic document and user input for adding one or more electronic annotations to the electronic document. The method can further comprise generating, by the server computer system, an annotated version of the electronic document that includes the one or more electronic annotations based on the user input. The server computer system can then send the annotated version of the electronic document to a recipient designated by the user.

17 Claims, 21 Drawing Sheets

(56) References Cited

U.S. PATENT DOCUMENTS

| | | | |
|---|---|---|---|
| 2008/0235221 A1* | 9/2008 | Burns et al. | 707/6 |
| 2008/0313082 A1* | 12/2008 | Van Bosch et al. | 705/50 |
| 2009/0024912 A1* | 1/2009 | McCabe et al. | 715/224 |
| 2009/0025087 A1* | 1/2009 | Peirson et al. | 726/27 |
| 2009/0076960 A2* | 3/2009 | Hamel et al. | 705/50 |
| 2009/0287697 A1* | 11/2009 | Minogue et al. | 707/5 |
| 2010/0037062 A1* | 2/2010 | Carney | 713/176 |
| 2010/0100743 A1* | 4/2010 | Ali et al. | 713/176 |
| 2010/0128291 A1* | 5/2010 | Vendrow et al. | 358/1.9 |
| 2010/0205545 A1* | 8/2010 | Dawson et al. | 715/758 |
| 2010/0217987 A1* | 8/2010 | Shevade | 713/175 |
| 2010/0217996 A1* | 8/2010 | Ross et al. | 713/179 |
| 2011/0276875 A1* | 11/2011 | McCabe et al. | 715/255 |
| 2013/0159720 A1* | 6/2013 | Gonser | H04L 9/3281 713/176 |
| 2013/0212404 A1* | 8/2013 | Pravetz et al. | 713/189 |

OTHER PUBLICATIONS http://www2.efax.com; Downloaded Jul. 28, 2015; 1 page.
https://www.echosign.adobe.com/en/home.html; Downloaded Jul. 28, 2015; 2 pages.
https://www.scrypt.com/sfax/; Downloaded Jul. 28, 2015; 4 pages.
http://www.mylivesignature.com/mls_sigdraw.php; Downloaded Jul. 28, 2015; 2 pages.
http://www.ringcentral.com; Downloaded Jul. 28, 2015; 3 pages.
http://www.docusign.com; Downloaded Jul. 28, 2015; 6 pages.
http://www.cudasign.com/; Downloaded Jul. 28, 2015; 7 pages.
http://www.4sightfax.com; Downloaded Jul. 28, 2015; 4 pages.

* cited by examiner

SYSTEMS AND METHODS FOR ANNOTATING AND SENDING ELECTRONIC DOCUMENTS

CROSS REFERENCE TO RELATED APPLICATIONS

The present application claims the benefit and priority under 35 U.S.C. 119(e) of U.S. Provisional Application No. 61/530,898, filed Sep. 2, 2011, entitled "SYSTEMS AND METHODS OF PROCESSING AND SENDING ELECTRONIC DOCUMENTS," the entire contents of which are incorporated herein by reference for all purposes.

BACKGROUND

In many fields and businesses, it is often necessary for one party to annotate (e.g., sign, initial, or otherwise markup) a document and then send the annotated document to another party for collection, processing, and/or recordation. Examples of such documents include contracts/agreements, acknowledgment forms, legal oaths/declarations, and so on. In cases where the document originates in electronic form, the annotating party must generally print out a hardcopy of the document, annotate the hardcopy (using, e.g., wet ink), and then fax, or scan in and email, the annotated document to the receiving party. This process can be time consuming and inconvenient, particularly if the annotating party does not have easy access to a fax machine or scanner, or if there is a large volume of documents to annotate and send.

Thus, it would be desirable to have improved techniques for document annotation and distribution that address the foregoing and other similar issues.

SUMMARY

According to one embodiment, a method is provided that can comprise receiving, by a server computer system from a user operating a client computing device, an electronic document and user input for adding one or more electronic annotations to the electronic document. The method can further comprise generating, by the server computer system, an annotated version of the electronic document that includes the one or more electronic annotations based on the user input. The server computer system can then send the annotated version of the electronic document to a recipient designated by the user.

In one embodiment, the one or more electronic annotations can include at least one of a text string, a checkmark, or an electronic signature.

In one embodiment, the annotated version of the electronic document can be sent in a facsimile format to a fax number of the recipient.

In one embodiment, the annotated version of the electronic document can be sent in an email format to an email address of the recipient.

In one embodiment, the user input for adding the one or more electronic annotations to the electronic document can include user input for selecting an annotation type.

In one embodiment, the user input for adding the one or more electronic annotations to the electronic document can include user input for positioning the one or more electronic annotations within the electronic document.

In one embodiment, the user input for adding the one or more electronic annotations to the electronic document can include user input for sizing the one or more electronic annotations.

In one embodiment, the one or more electronic annotations can include an electronic signature, and the method can further comprise generating a first user interface that provides the user a plurality of options for entering the electronic signature.

In one embodiment, the plurality of options for entering the electronic signature can include an option for drawing the electronic signature via a pointing device of the client computing device.

In one embodiment, the plurality of options for entering the electronic signature can include an option for uploading a signature image from the client computing device.

In one embodiment, the plurality of options for entering the electronic signature can include an option for retrieving a signature image previously associated with the user.

In one embodiment, the plurality of options for entering the electronic signature can include an option for capturing and submitting a signature image via a smartphone. If this option is selected, the method can further comprise generating a unique identifier and instructing the user to transmit, from the user's smartphone, an email message that includes the signature image and that specifies the unique identifier in the email's subject line.

Upon receiving the email message, the method can further comprise associating the email message with the user via the unique identifier, extracting the signature image from the email message, and generating a second user interface for presenting the signature image to the user.

In one embodiment, the second user interface can enable the user to crop or adjust the contrast of the signature image.

In one embodiment, the receiving, generating, and sending can be performed by a web application running on the server computer system.

According to another embodiment of the present invention, a system is provided that includes a processor. The processor can be configured to receive, from a user, an electronic document and user input for adding one or more electronic annotations to the electronic document. The processor can be further configured to generate an annotated version of the electronic document that includes the one or more electronic annotations based on the user input, and to send the annotated version of the electronic document to a recipient designated by the user.

According to yet another embodiment of the present invention, a non-transitory computer-readable storage medium is provided that has stored thereon program code executable by a processor. The program code can include code that causes the processor to receive, from a user, an electronic document and user input for adding one or more electronic annotations to the electronic document. The program code can further include code that causes the processor to generate an annotated version of the electronic document that includes the one or more electronic annotations based on the user input, and to send the annotated version of the electronic document to a recipient designated by the user.

A further understanding of the nature and advantages of the embodiments disclosed herein can be realized by reference to the remaining portions of the specification and the attached drawings.

DETAILED DESCRIPTION

Embodiments of the present invention provide systems and methods for annotating and sending electronic documents. In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

System Overview

Figure 1:
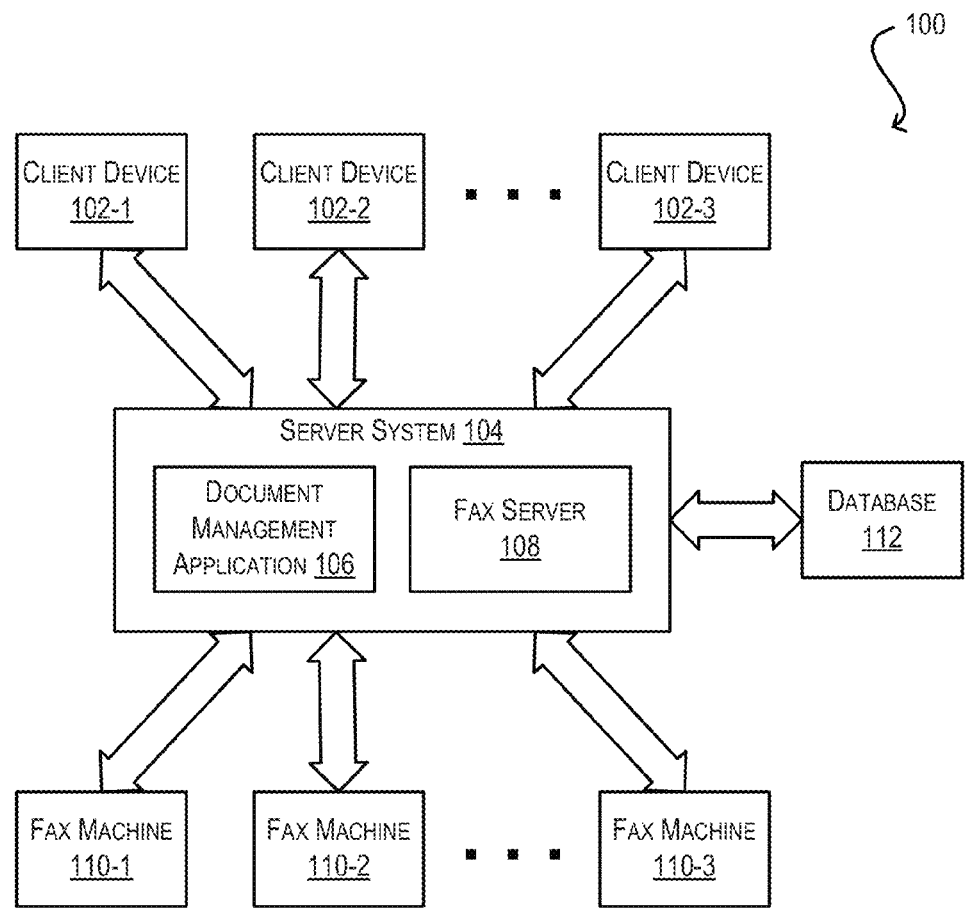
FIG. 1 is a simplified block diagram of a system environment in accordance with an embodiment of the present invention.

FIG. 1 is a simplified block diagram of a system environment 100 according to an embodiment of the present invention. As shown, system environment 100 includes a number of client devices (102-1, 102-2, and 102-3) that are communicatively coupled with a server system 104. Client devices 102-1, 102-2, 102-3 and server system 104 can be coupled via any type of computer network known in the art, such as a local area network (LAN), a wide area network (WAN), or the Internet. Although FIG. 1 depicts three client devices and one server system, any number of these entities can be supported.

Client devices 102-1, 102-2, and 102-3 are end-user computing devices, such as a desktop computer, a laptop computer, a personal digital assistant, a smartphone, a tablet, or the like. In one embodiment, client devices 102-1, 102-2, and 102-3 can each execute (via, e.g., a standard web browser or proprietary software) a client component of a distributed software application hosted on server system 104, thereby enabling users of client devices 102-1, 102-2, and 102-3 to interact with the application. In the case of a web application, executing this client component can include rendering, in a client web browser, HyperText Markup Language (HTML) content that is received from server system 104, receiving user input via one or more HTML input controls, and transmitting the user input via an HTTP request to server system 104. Execution of the client component can also include running program code, such as JavaScript or a Java applet, that may be received from server system 104.

Server system 104 is a computer system (or a cluster/farm of computer systems) that is configured to provide an environment in which the server component of a distributed software application can be executed. For example, server system 104 can receive a request from client 102-1, 102-2, or 102-3 that is directed to an application hosted on server system 104, process the request using business logic defined for the application, and then generate information responsive to the request for transmission to the client. In embodiments where server system 104 is configured to host one or more web applications, server system 104 can incorporate a web server component (not shown) to handle the web-specific tasks of receiving Hypertext Transfer Protocol (HTTP) requests from clients 102-1, 102-2, and 102-3 and servicing those requests by returning HTTP responses.

In the example of FIG. 1, server system 104 is configured to host a particular type of application shown as document management application 106. Document management application 106 can be implemented as either a web application or a proprietary client-server application, and can provide various functions for facilitating the annotation and transmission of electronic documents. For instance, document management application 106 can receive, from client device 102-1, 102-2, or 102-3, an upload of an electronic document. Document management application 106 can then present a series of user interfaces that allow a user of the client device to edit the electronic document by adding one or more electronic annotations. Examples of such electronic annotations include text, checkmarks, electronic signatures, and so on. In the case of an electronic signature, document management application 106 can provide the user a number of different options for submitting his/her signature, such as drawing in the signature via a pointing device (e.g., mouse) of the user's client device, uploading a signature image from the client device, and/or capturing and submitting a signature image via the user's smartphone.

Once the user has completed the process of adding electronic annotations, document management application 106 can generate an annotated version of the electronic document and can send the annotated version to one or more recipients designated by the user. For instance, in one embodiment, the user can specify a recipient email address, thereby causing document management application 106 to send the annotated version of the electronic document in an email format to the specified email address. In another embodiment, the user can specify a recipient fax number, thereby causing document management application 106 to send the annotated version of the electronic document in a facsimile format to the specified fax number. In the latter case, document management application 106 can interoperate with a fax server component 108 that enables server system 104 to communicate with fax machines (e.g., 110-1, 110-2, and 110-3) over a standard telephone network. Although fax server 108 is shown as being part of server system 104, in alternative embodiments fax server 108 can be hosted on, or implemented as, a separate physical machine.

As part of its processing, document management application 106 can interact with a database 112 to store and retrieve information pertaining to the users of application 106 and their associated data (e.g., user account information, document transmission history, electronic signatures, etc.). In one embodiment, database 112 can be implemented using a relational database program (e.g., Oracle 11g, SQLite, MySQL, etc.) that is adapted to store, update, and retrieve data in response to SQL-formatted commands. Although database 112 is depicted as being separate from server system 104, in alternative embodiments server system 104 and database 112 can be integrated into a single physical machine.

It should be appreciated that system environment 100 is illustrative and is not intended to limit embodiments of the present invention. For example, the various entities depicted in system environment 100 can have other capabilities or include other components that are not specifically described. One of ordinary skill in the art will recognize many variations, modifications, and alternatives.

Computer System Embodiment

Figure 2:
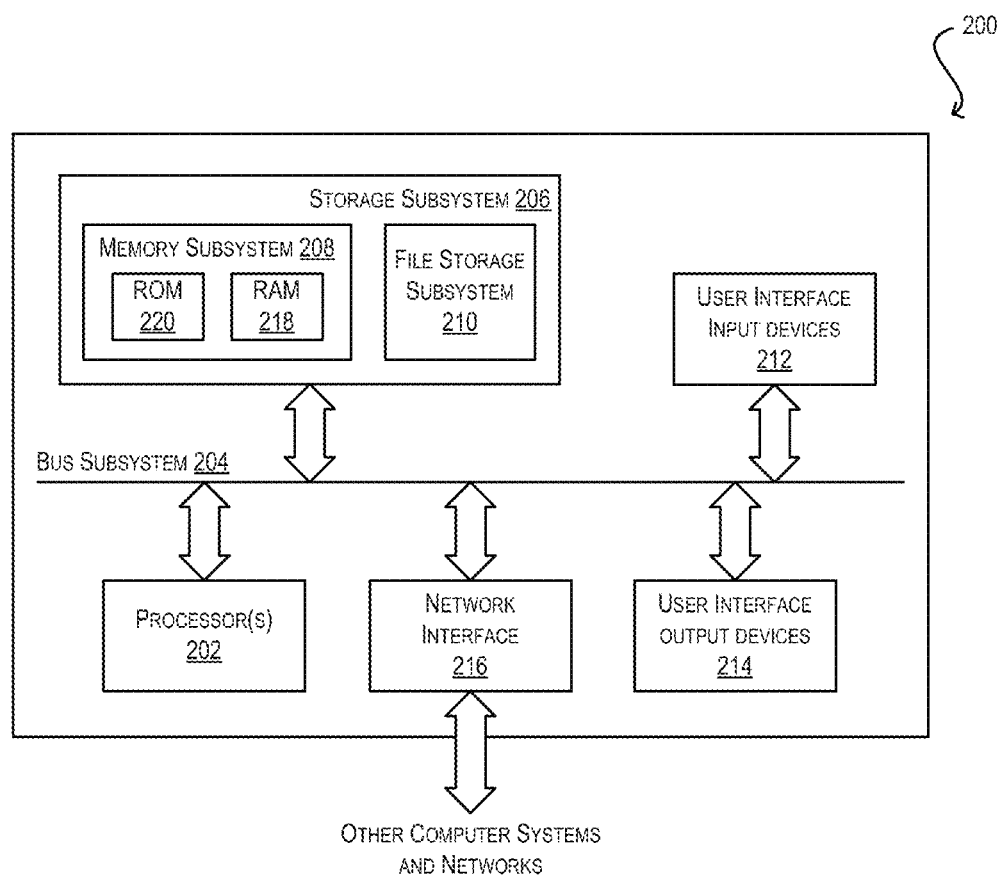
FIG. 2 is a simplified block diagram of a computer system in accordance with an embodiment of the present invention.

FIG. 2 is a simplified block diagram of a computer system 200 according to an embodiment of the present invention. Computer system 200 can be used to implement any of the computing devices/systems described with respect to FIG. 1, such as server system 104 and client devices 102-1, 102-2, and 102-3. As shown in FIG. 2, computer system 200 includes one or more processors 202 that can communicate with a number of peripheral devices via a bus subsystem 204. These peripheral devices include a storage subsystem 206 (comprising a memory subsystem 208 and a file storage subsystem 210), user interface input devices 212, user interface output devices 214, and a network interface subsystem 216.

Bus subsystem 204 can provide a mechanism for letting the various components and subsystems of computer system 200 communicate with each other as intended. Although bus subsystem 204 is shown schematically as a single bus, alternative embodiments of the bus subsystem can utilize multiple busses.

Network interface subsystem 216 can serve as an interface for communicating data between computer system 200 and other computer systems or networks. Embodiments of network interface subsystem 216 can include, e.g., an Ethernet card, a Wi-Fi and/or cellular adapter, a modem (telephone, satellite, cable, ISDN, etc.), digital subscriber line (DSL) units, and/or the like.

User interface input devices 212 can include a keyboard, pointing devices (e.g., mouse, trackball, touchpad, etc.), a scanner, a barcode scanner, a touch-screen incorporated into a display, audio input devices (e.g., voice recognition systems, microphones, etc.) and other types of input devices. In general, use of the term "input device" is intended to include all possible types of devices and mechanisms for inputting information into computer system 200.

User interface output devices 214 can include a display subsystem, a printer, or non-visual devices such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 200.

Storage subsystem 206 includes a memory subsystem 208 and a file/disk storage subsystem 210. Subsystems 208 and 210 represent non-transitory computer-readable storage media that can store program code and/or data that provide the functionality of embodiments of the present invention.

Memory subsystem 208 includes a number of memories including a main random access memory (RAM) 218 for storage of instructions and data during program execution and a read-only memory (ROM) 220 in which fixed instructions are stored. File storage subsystem 210 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 200 is illustrative and not intended to limit embodiments of the present invention. Many other configurations having more or fewer components than system 200 are possible.

Annotating and Sending Electronic Documents

Figure 3:
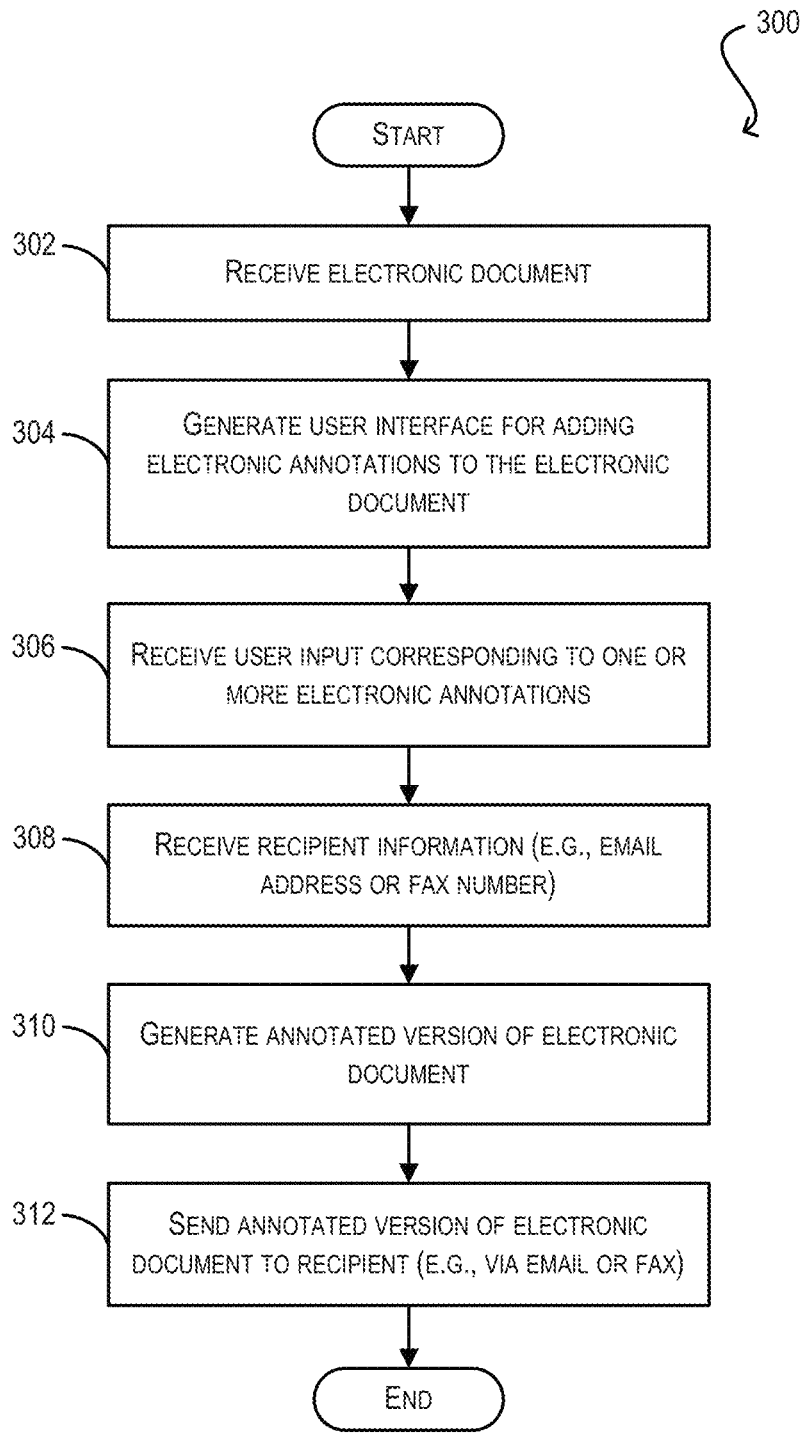
FIG. 3 is a flow diagram of a process for annotating and sending an electronic document in accordance with an embodiment of the present invention.

FIG. 3 illustrates a process 300 that can be performed by document management application 106 of FIG. 1 for facilitating electronic document annotation and transmission according to an embodiment of the present invention.

Figure 4:
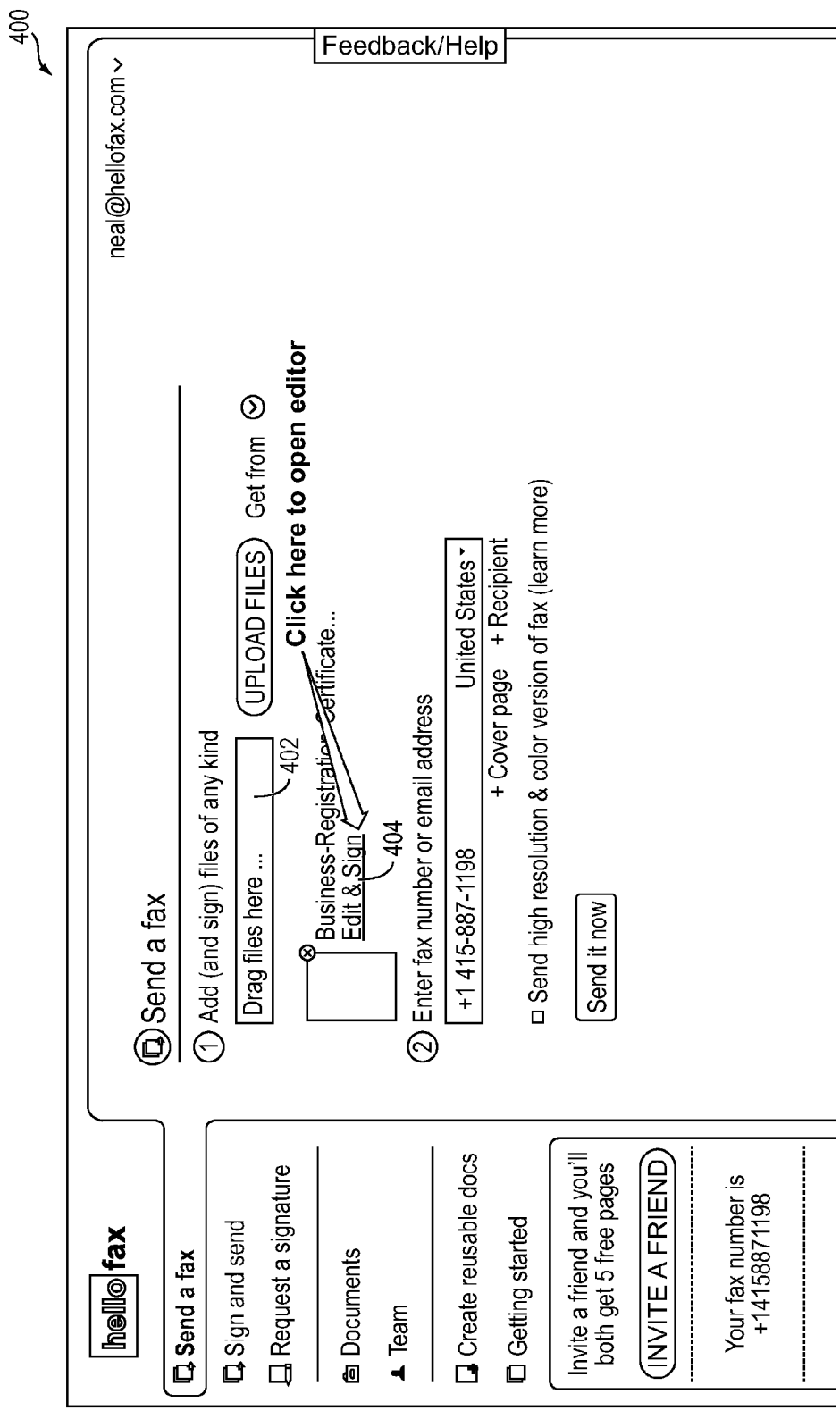
FIG. 4 is an example user interface illustrating controls for uploading and initiating annotation of an electronic document in accordance with an embodiment of the present invention.

At block 302, document management application 106 can receive an electronic document from a user of a client device (e.g., client device 102-1, 102-2, or 102-3). For example, in one embodiment, document management application 106 can generate an initial user interface (UI) (e.g., UI 400 of FIG. 4) that allows the user to upload an electronic document by dragging the document into an appropriate control field (e.g., field 402). Once uploaded, the contents of the electronic document can be converted into a standard image format (e.g., a series of PNG images).

Figure 5:
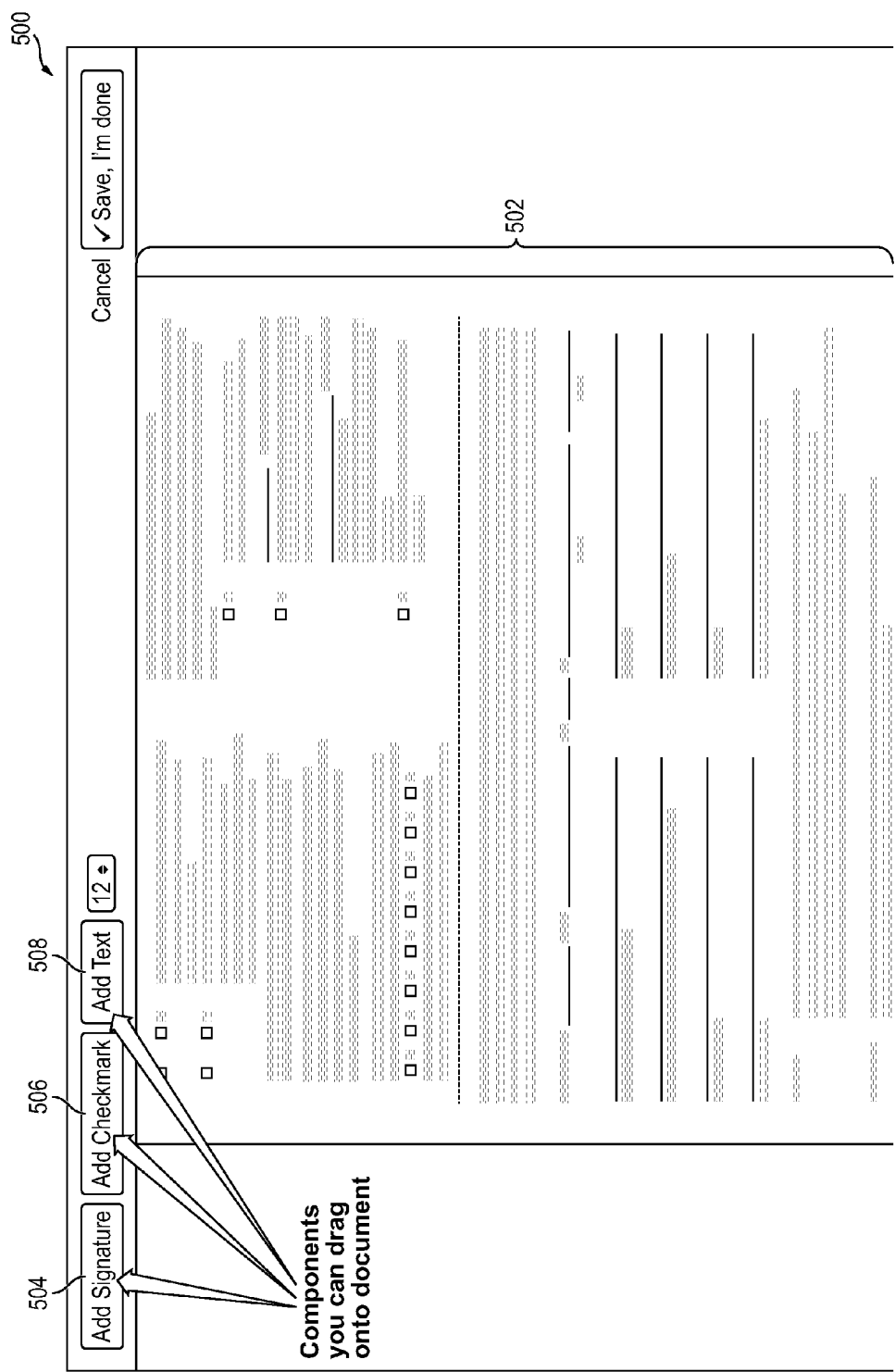
FIG. 5 is an example user interface illustrating controls for adding annotations to an electronic document in accordance with an embodiment of the present invention.

At block 304, document management application 106 can generate an "editor" UI for adding electronic annotations to the electronic document (block 304). In certain embodiments, this step can be initiated in response to a signal from the user (e.g., activation of "Edit & Sign" link 404 shown in FIG. 4). Alternatively, this step can be initiated automatically once the electronic document has been successfully uploaded and converted. FIG. 5 illustrates an example (500) of the editor UI. As shown, editor UI 500 is configured to display the contents of the electronic document in a display area 502. In addition, editor UI 500 is configured to display a number of controls (504, 506, and 508) corresponding to various electronic annotations that can be added to the document. In the example of FIG. 5, three different types of annotations (text, checkmark, electronic signature) can be added. In alternative embodiments, other annotation types (e.g., initials, lines, freeform drawing, etc.) may also be supported.

Figure 7:
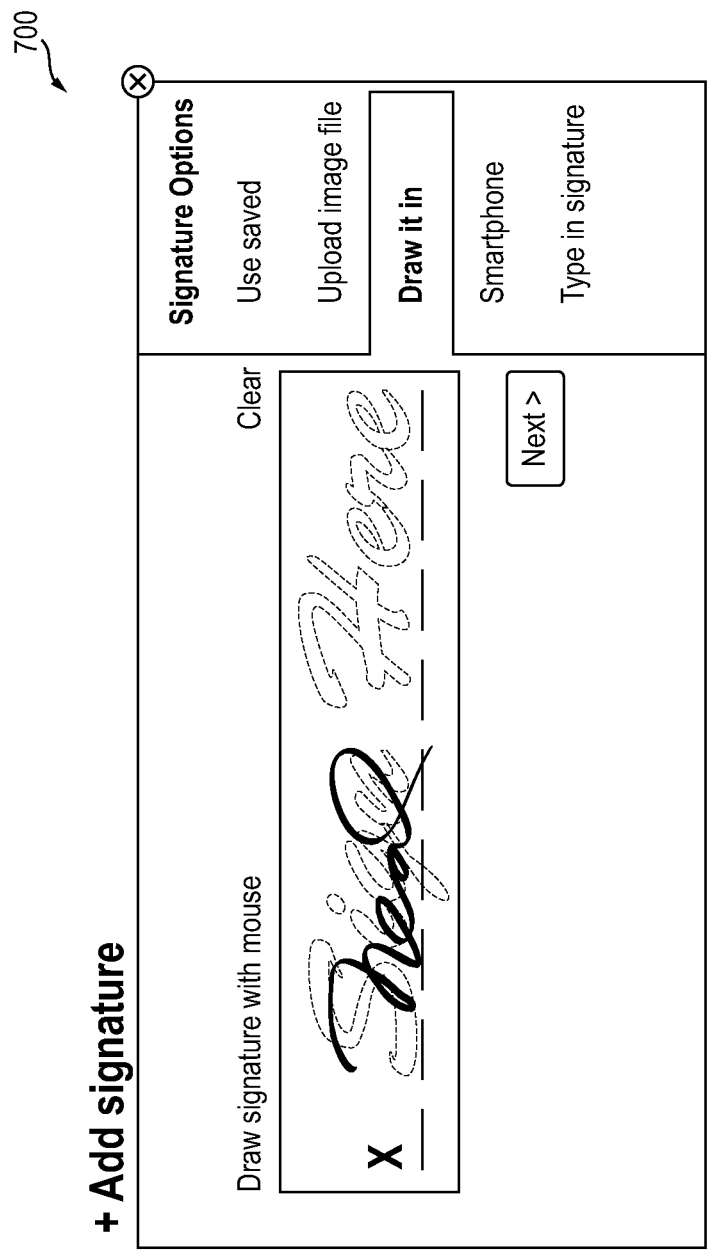
FIGS. 7 and 8 are example user interfaces for drawing in an electronic signature and reviewing the drawn signature in accordance with an embodiment of the present invention.
Figure 8:
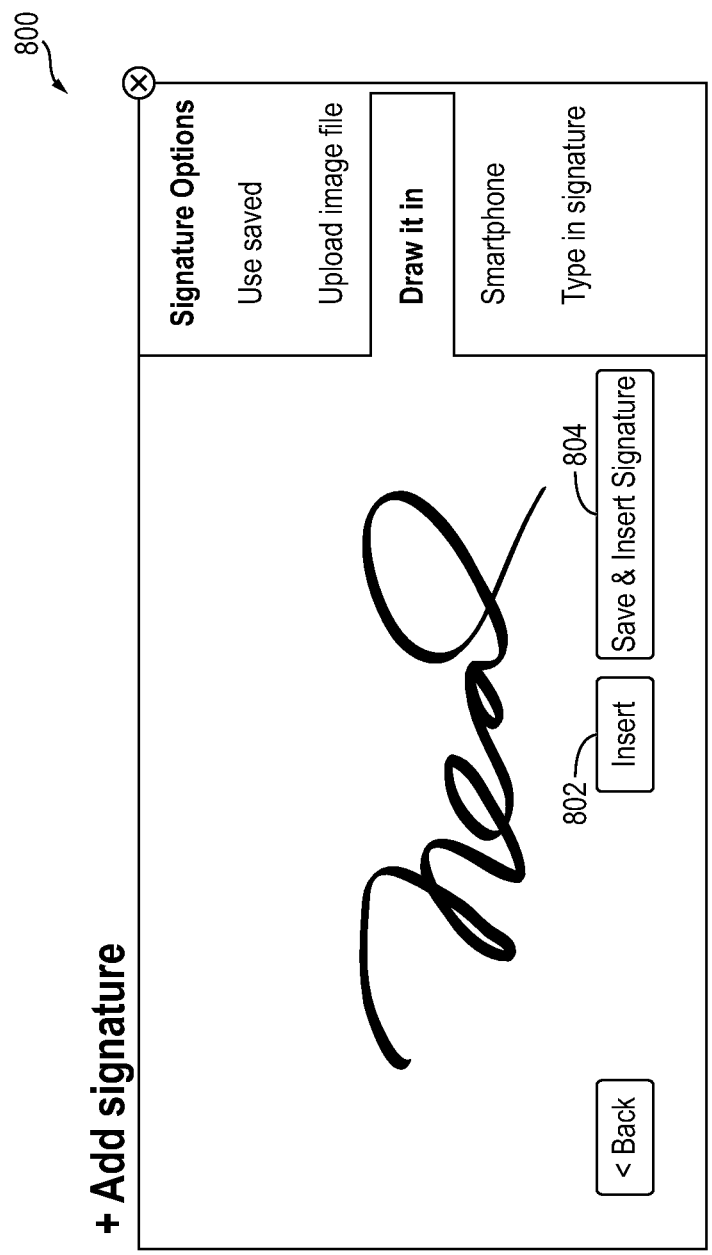

Once the editor UI has been generated and displayed to the user, document management application 106 can receive user input for adding one or more electronic annotations to the electronic document (block 306). For instance, if the user wishes to add an electronic signature, the user can activate the "Add Signature" control 504 shown in FIG. 5 (or drag and drop the control into display area 502). In response, document management application 106 can generate a modal UI (e.g., UI 600 of FIG. 6) that provides the user various options for submitting his/her electronic signature. In one embodiment, the various options can include an option of drawing in the signature via a pointing device (e.g., mouse, touchscreen, etc.) of the user's client device. This process is shown via UIs 700 and 800 of FIGS. 7 and 8. Note that in UI 800, the user has the option of inserting the drawn signature into the electronic document using the "Insert" control 802, or inserting and saving the drawn signature using the "Save & Insert Signature" control 804. If the user selects control 804, document management application 106 can, in addition to inserting the signature into the document, save the signature for reuse at a later time (thereby allowing the user to electronically sign additional documents without redrawing his/her signature). This saved signature can be associated with the user and stored in database 112 of FIG. 1.

In further embodiments, the various options presented in UI 600 can include, e.g., an option of typing in the signature, an option of uploading a signature image from the user's client device, an option for reusing a previously saved signature (as noted above), and an option of capturing and submitting a signature image via a smartphone. This last option is described in greater detail with respect to FIGS. 16-21 below.

Figure 9:
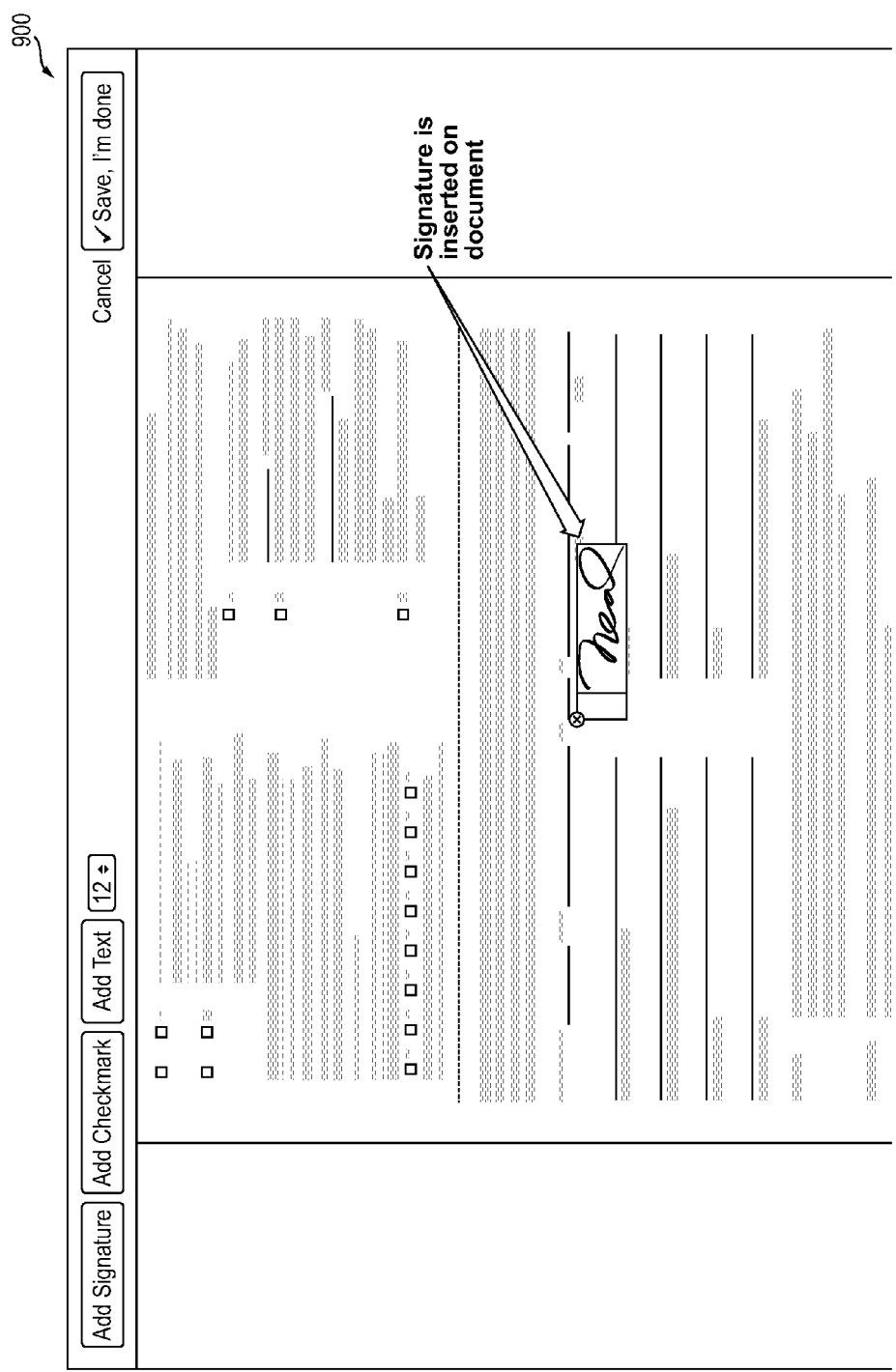
FIG. 9 is an example user interface illustrating the addition/placement of an electronic signature within an electronic document in accordance with an embodiment of the present invention.

Once the user has provided an electronic signature via one of the options of UI 600, the user can place the signature within the electronic document as shown in UI 900 of FIG. 9. As part of this process, the user can alter the position and size of the signature as desired. The user can also choose to delete the signature and start over by providing a new electronic signature.

Figure 10:
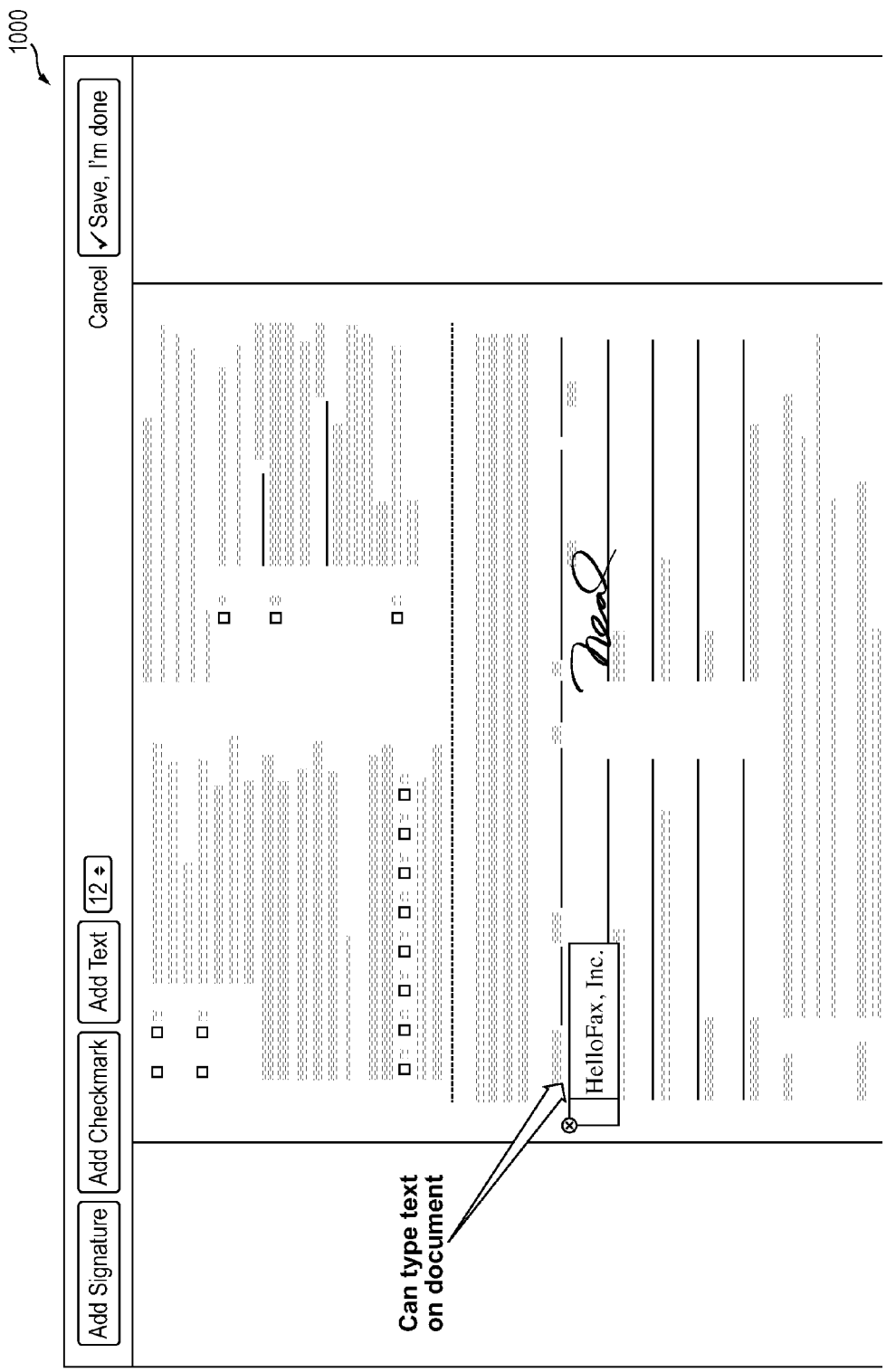
FIG. 10 is an example user interface illustrating the addition/placement of a text string within an electronic document in accordance with an embodiment of the present invention.
Figure 11:
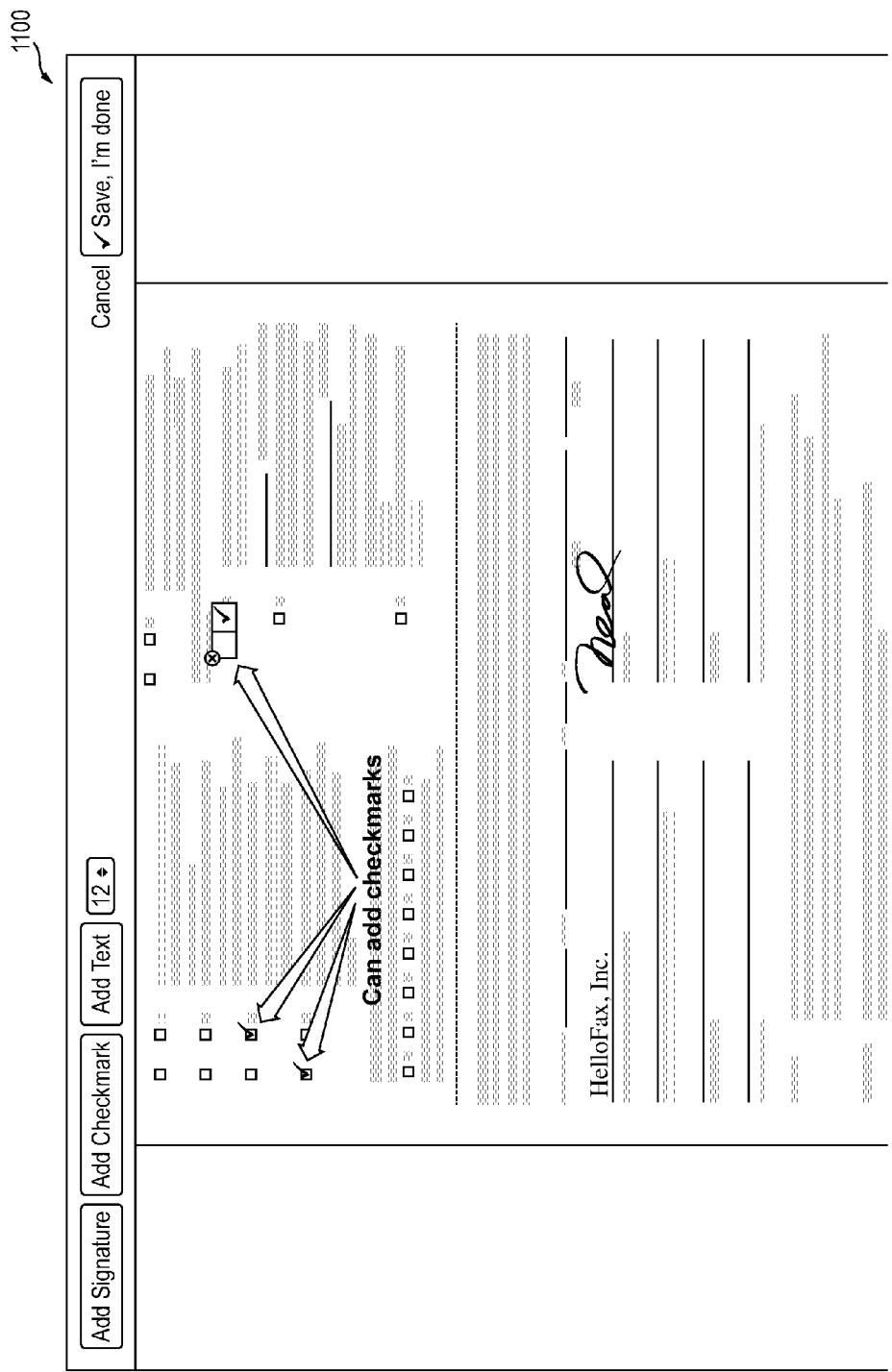
FIG. 11 is an example user interface illustrating the addition/placement of checkmarks within an electronic document in accordance with an embodiment of the present invention.

In addition to adding an electronic signature to the electronic document via editor UI 500, the user can also add a text string (via "Add Text" control 506) and/or a checkmark (via "Add Checkmark" control 508). Like "Add Signature" control 504, controls 506 and 508 can be simply dragged and dropped into display area 502 in order to add the corresponding annotations to the document. Further, the user can move, resize, and/or delete each text string or checkmark. FIGS. 10 and 11 illustrate example UIs 1000 and 1100 that show what display area 502 may look like after a text string and a number of checkmarks have been added.

Figure 12:
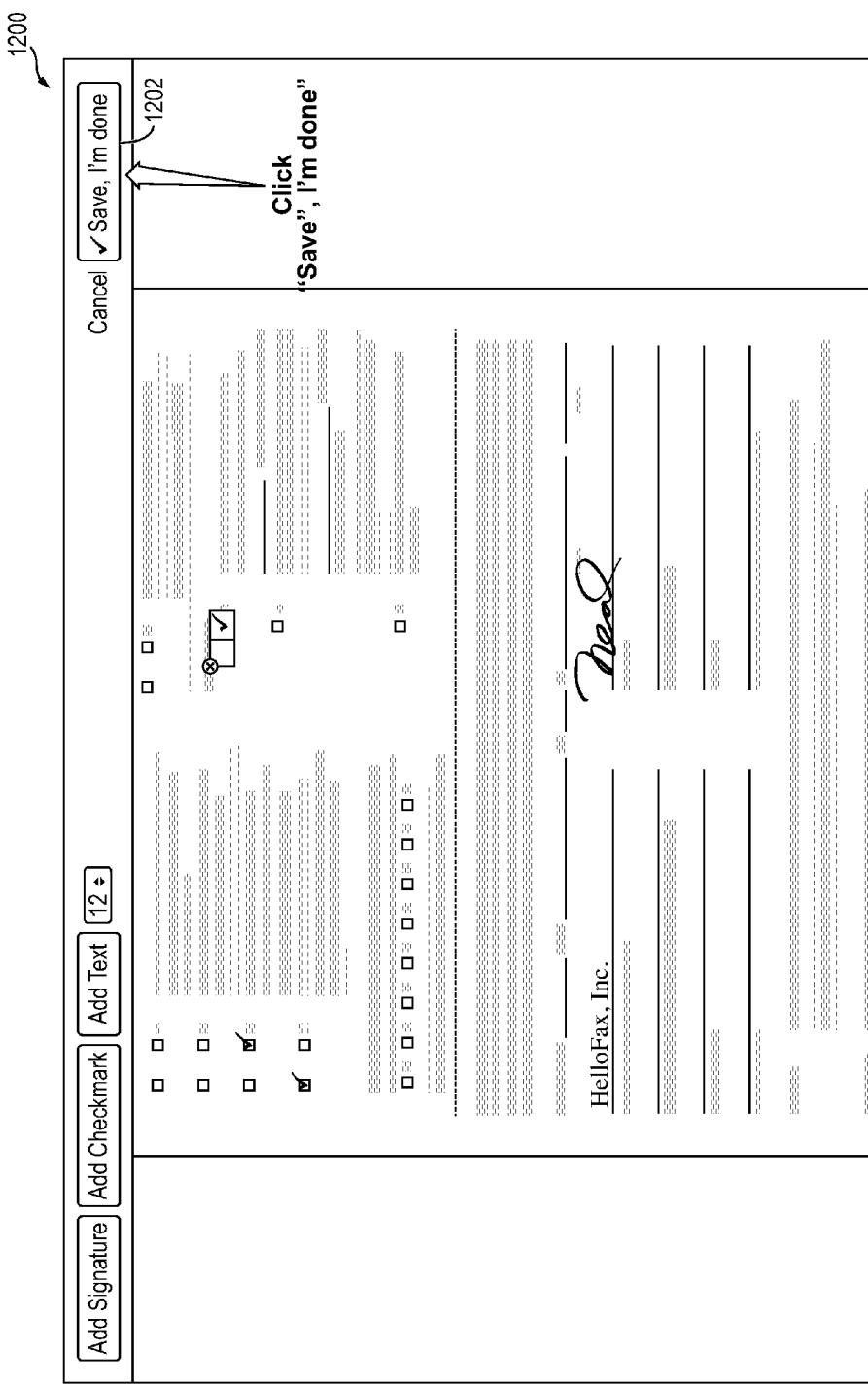
FIG. 12 is an example user interface illustrating a control for saving an annotated version of an electronic document in accordance with an embodiment of the present invention.
Figure 13:
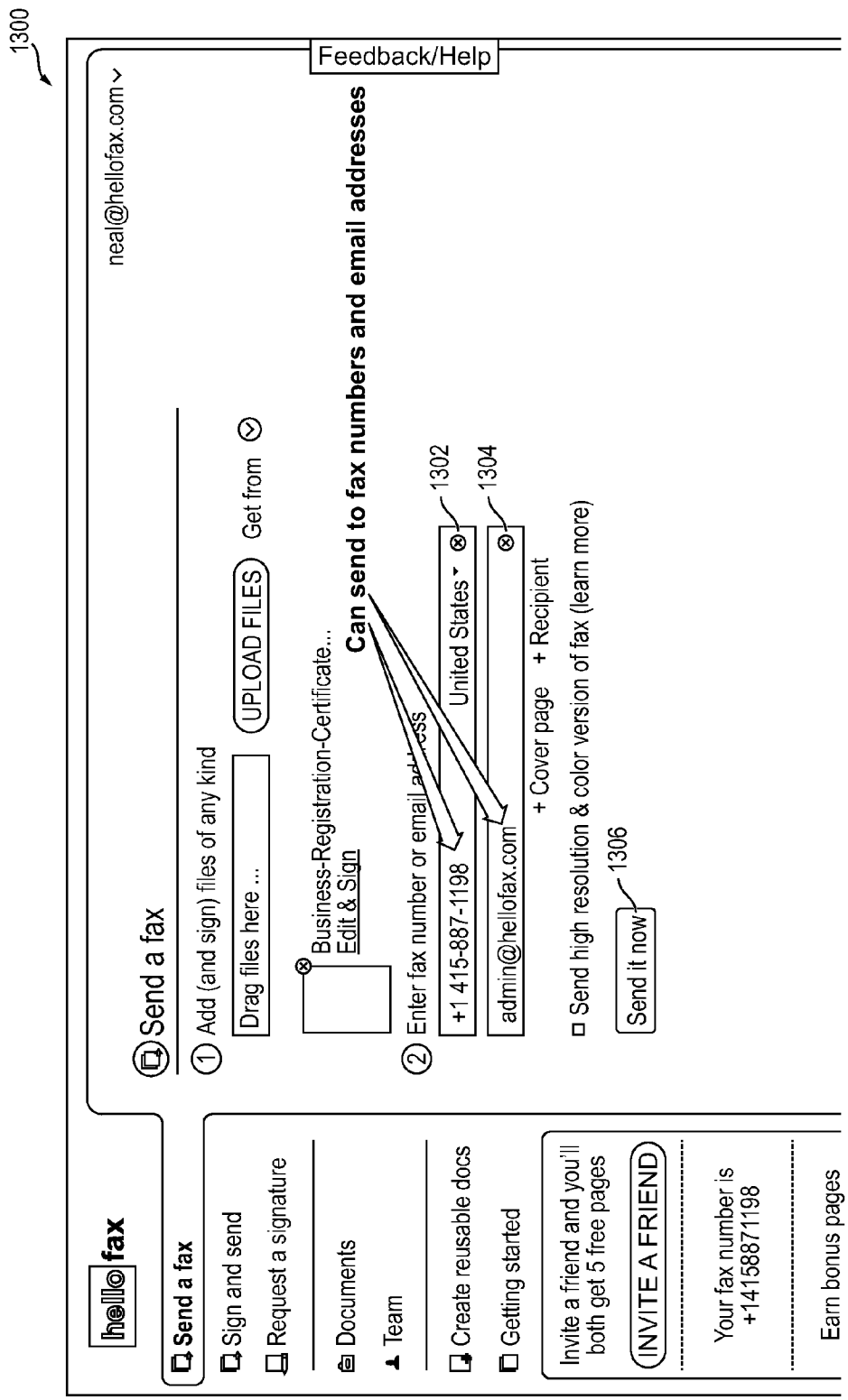
FIG. 13 is an example user interface illustrating fields for entering a recipient fax number or email address in accordance with an embodiment of the present invention.
Figure 14:
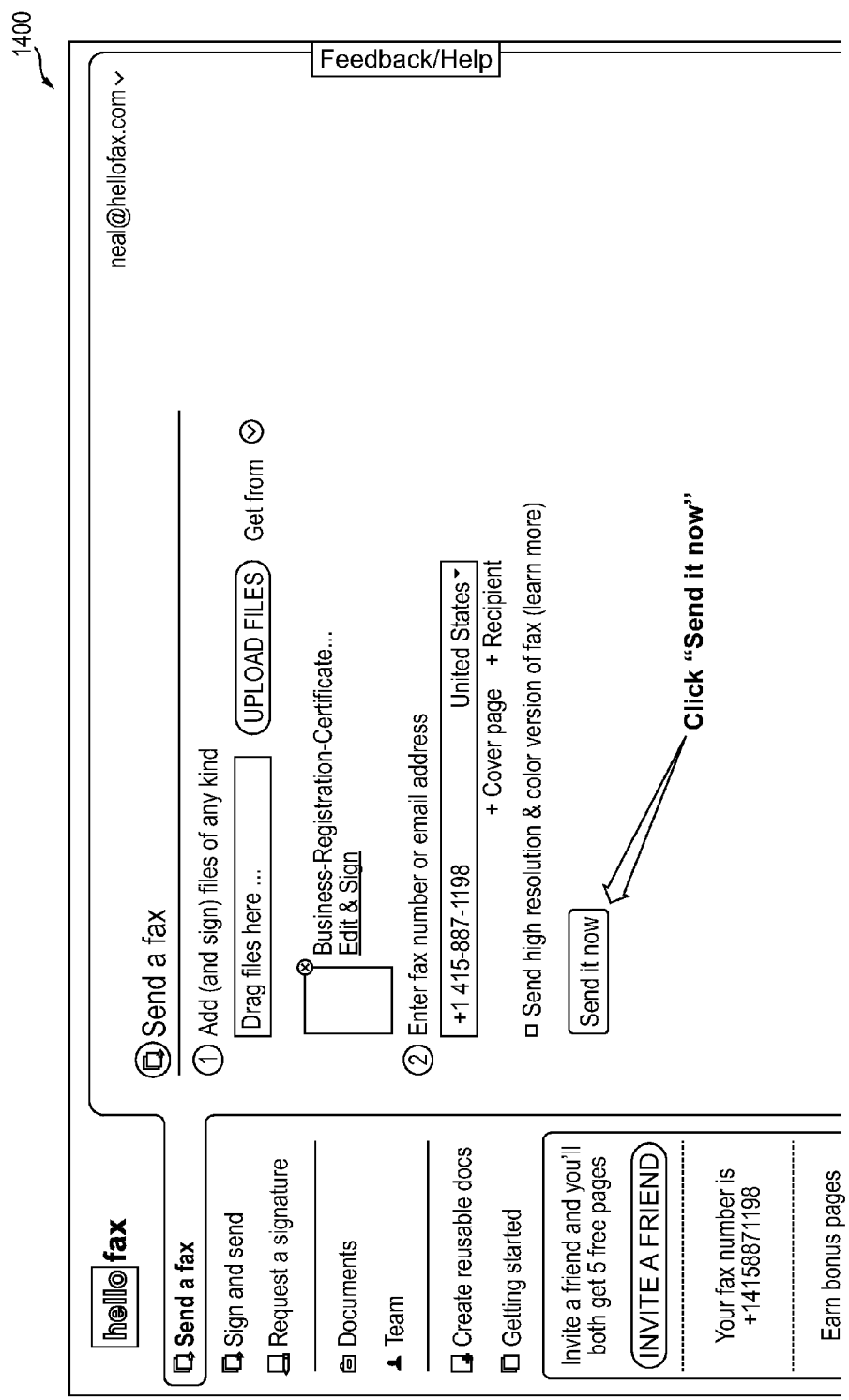
FIG. 14 is an example user interface illustrating a control for sending an annotated version of an electronic document to a recipient in accordance with an embodiment of the present invention.

Returning to FIG. 3, after the user has finished annotating the electronic document, the user can close the editor UI (by, e.g., activating the "Save, I'm Done" control 1202 in UI 1202 of FIG. 12) and provide information regarding an intended recipient (block 308). For example, the user can provide a recipient email address, a recipient fax number, or both. In one embodiment, this information can be entered via fields 1302 and 1304 shown in UI 1300 of FIG. 13.

Figure 15:
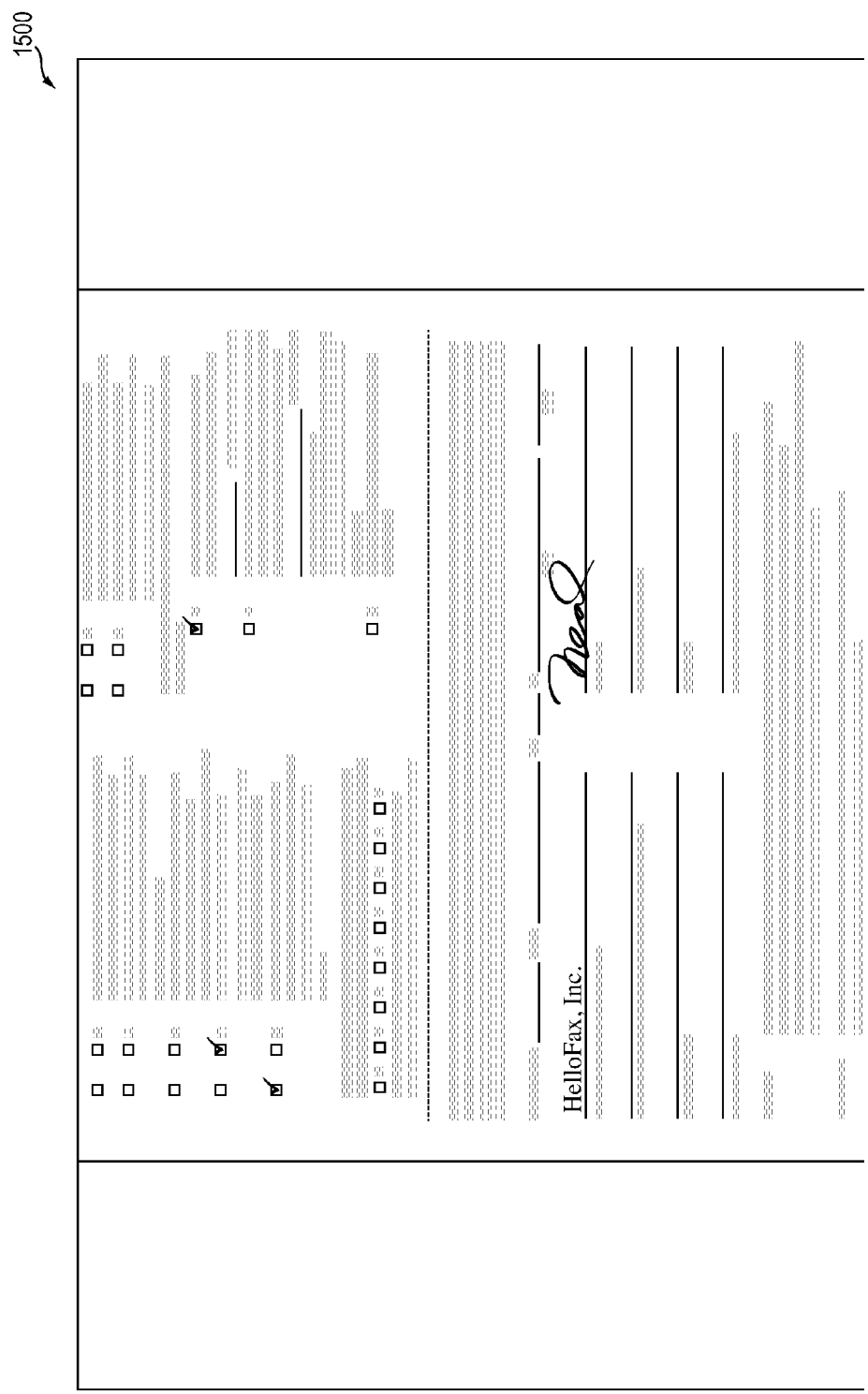
FIG. 15 illustrates an annotated version of an electronic document in accordance with an embodiment of the present invention.

The user can then activate "Send it now" control 1306, which causes document management application 106 to generate an annotated version of the electronic document and send out the annotated version to the recipient destination(s) specified at block 308 (blocks 310 and 312). In certain embodiments, the annotated version that is generated at block 310 can be tailored to the method of delivery. For instance, if the recipient is specified via an email address, the annotated version of the electronic document can be formatted as a Portable Document Format (PDF) file for attachment to an email message. Alternatively, if the recipient is specified via a fax number, the annotated version of the electronic document can be formatted as one or more TIFF files for transmission via facsimile. FIG. 15 illustrates an example annotated document 1500 that may be generated and sent out by document management application 106 at the conclusion of process 300.

Capturing/Submitting an Electronic Signature Via Smartphone

Figure 6:
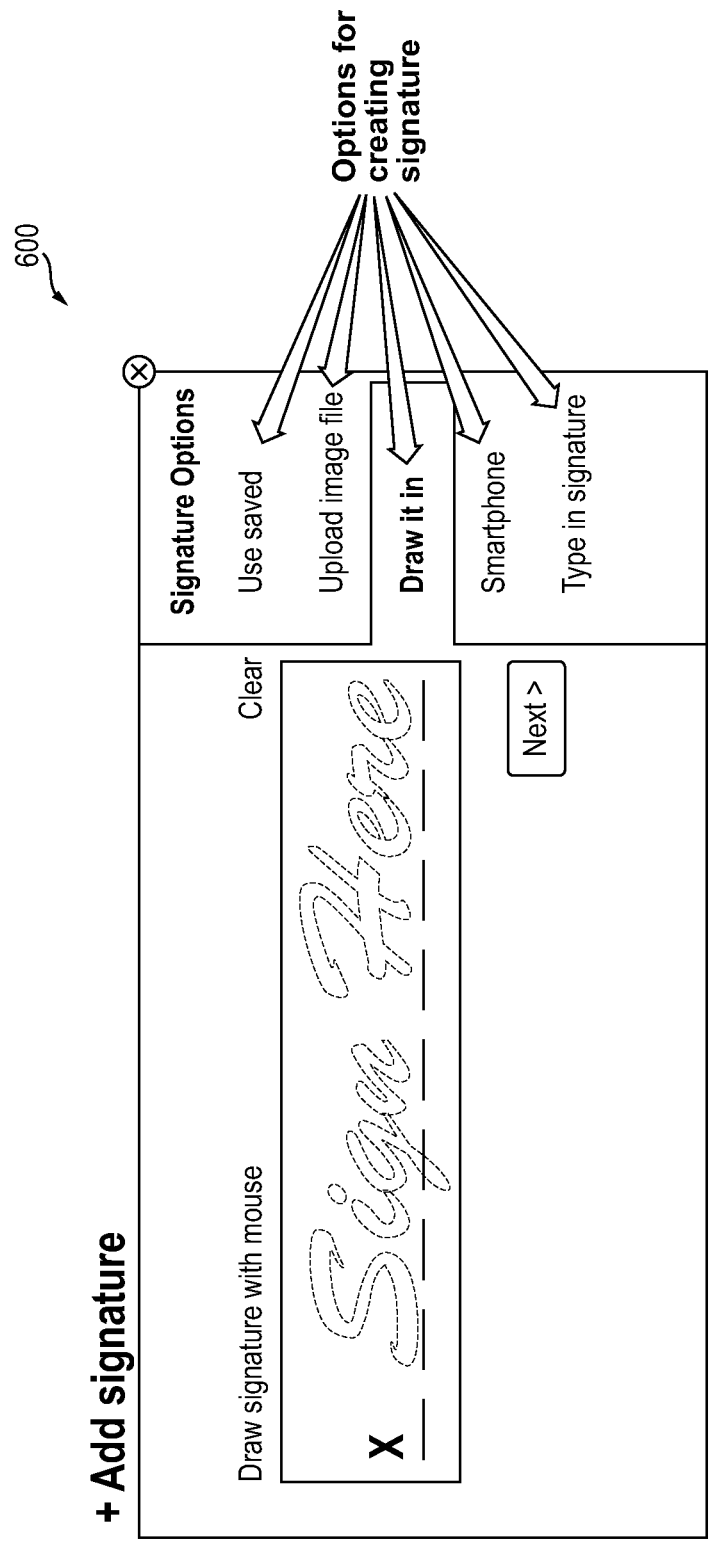
FIG. 6 is an example user interface illustrating various options for entering an electronic signature in accordance with an embodiment of the present invention.
Figure 16:
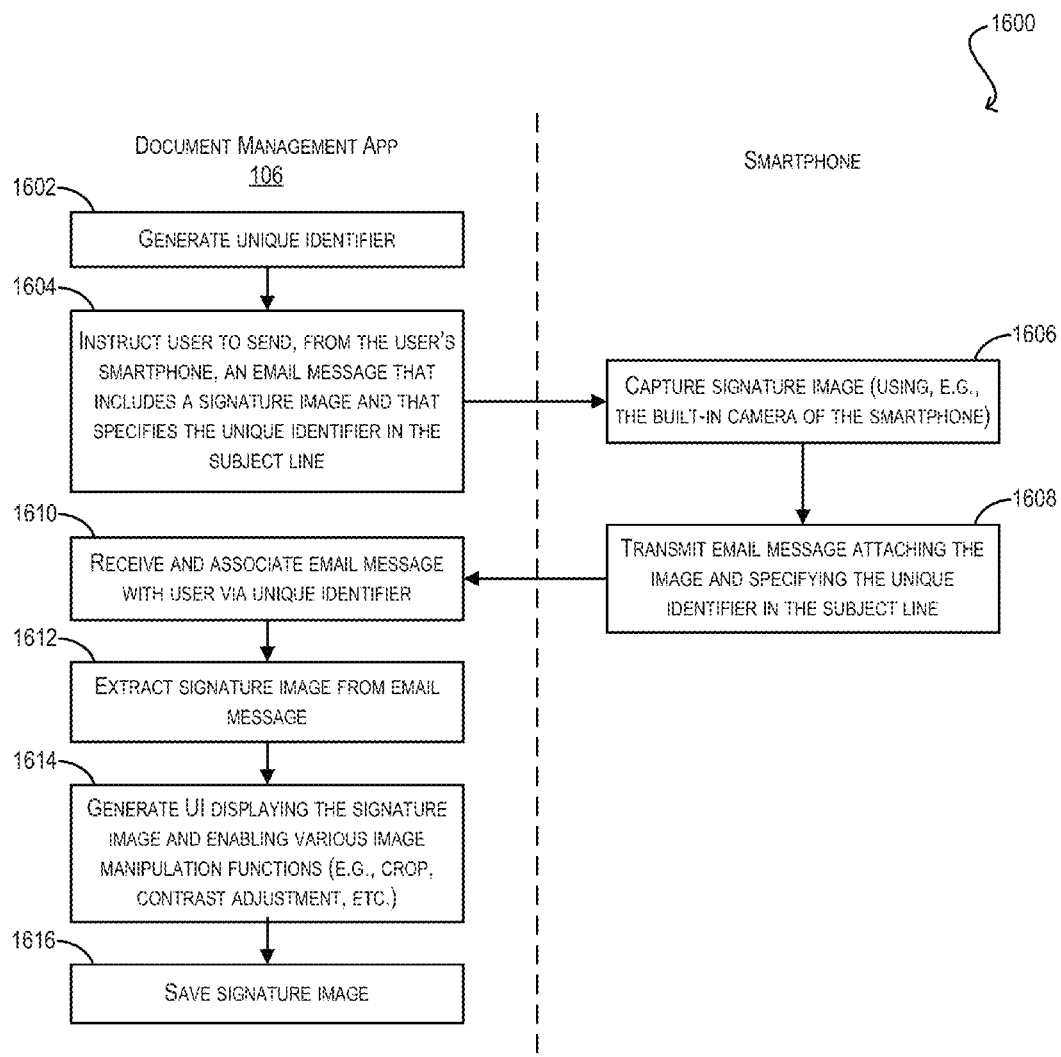
FIG. 16 is flow diagram of a process for capturing and submitting a signature image via a smartphone in accordance with an embodiment of the present invention.

As noted with respect to UI 600 of FIG. 6, the options that are presented to a user for adding an electronic signature to an electronic document can include an option for capturing and submitting the signature via the user's smartphone. FIG. 16 illustrates a process 1600 that can be performed for implementing this option. It should be appreciated that the embodiment of FIG. 16 is not strictly limited to smartphones per se, and can be applied to other types of devices (e.g., tablets, webcams, cameras, etc.) that are capable of capturing an image of a user's signature. One of ordinary skill in the art will recognize many variations, modifications, and alternatives.

Figure 17:
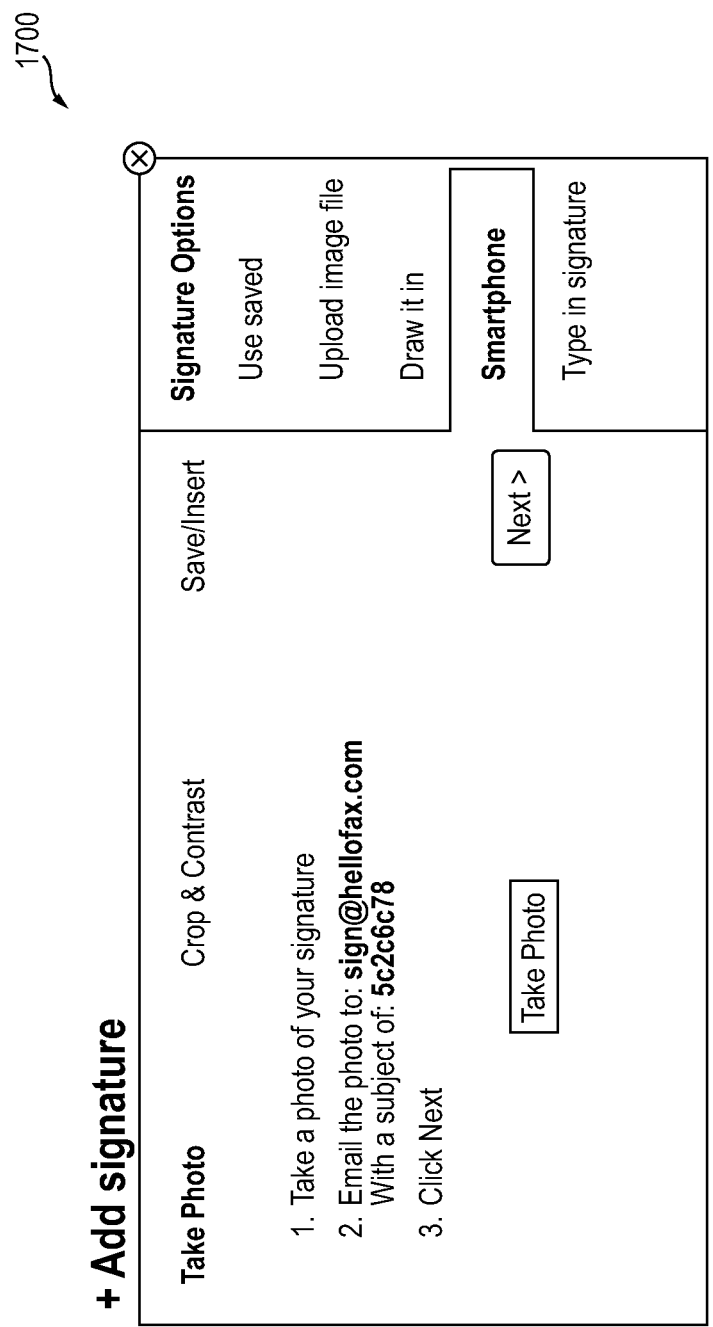
FIG. 17 is an example user interface providing instructions for emailing a signature image from a smartphone in accordance with an embodiment of the present invention.

At block 1602, document management application 106 can generate a unique identifier that is associated with the user. Application 106 can then instruct the user to capture an image of the user's signature via the user's smartphone and to send an email message to a predefined administrative email address (e.g., "sign@hellofax.com") that includes the signature image (e.g., via attachment or as an inline image) (block 1604). Application 106 can also instruct the user to include the unique identifier generated at block 1602 in the subject line of the email message (or at some other predefined location). FIG. 17 illustrates an example UI 1700 depicting these instructions.

Figure 18:
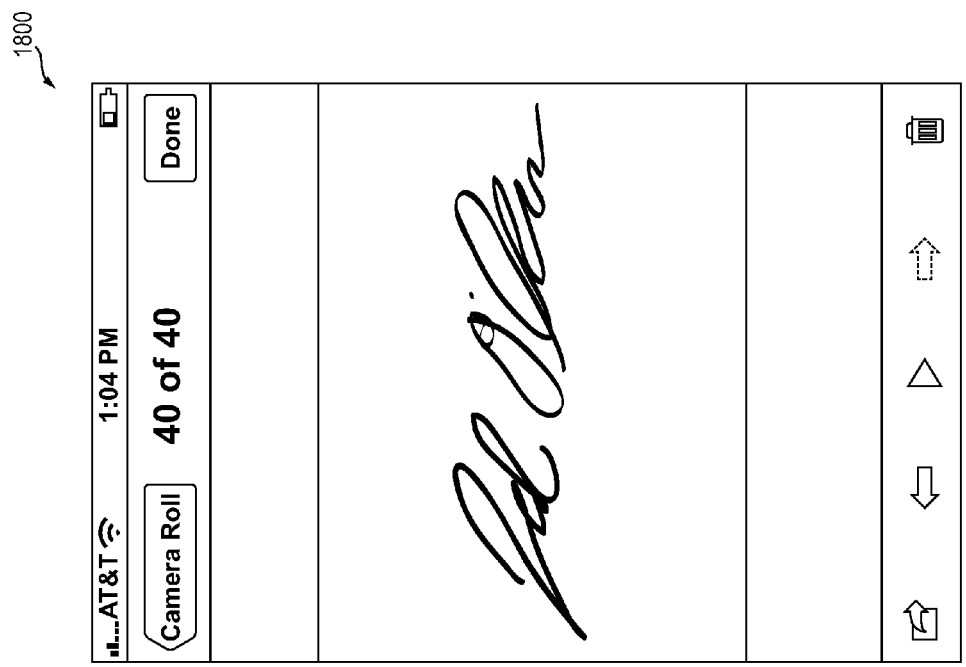
FIG. 18 illustrates the capture of a signature image via a smartphone camera in accordance with an embodiment of the present invention.
Figure 19:
FIG. 19 illustrates the sending of an email message (including the signature image) from a smartphone in accordance with an embodiment of the present invention.

At block 1606, the user can capture the signature image via his/her smartphone camera. FIG. 18 illustrates such a signature image 1800. At block 1608, the user can transmit, via the smartphone, an email message that includes the signature image and is formatted per the instructions provided at block 1604 (see, e.g., email message 1900 of FIG. 19).

Figure 20:
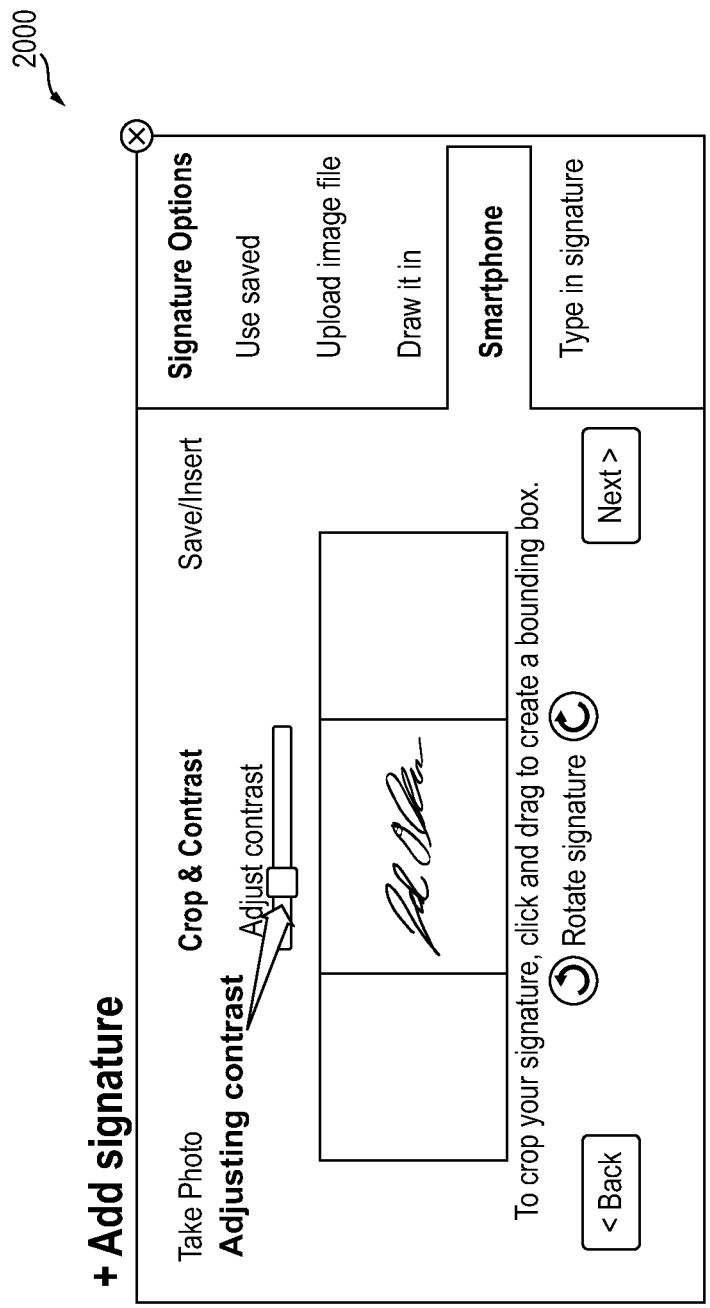
FIG. 20 is an example user interface for adjusting the contrast of a signature image in accordance with an embodiment of the present invention.
Figure 21:
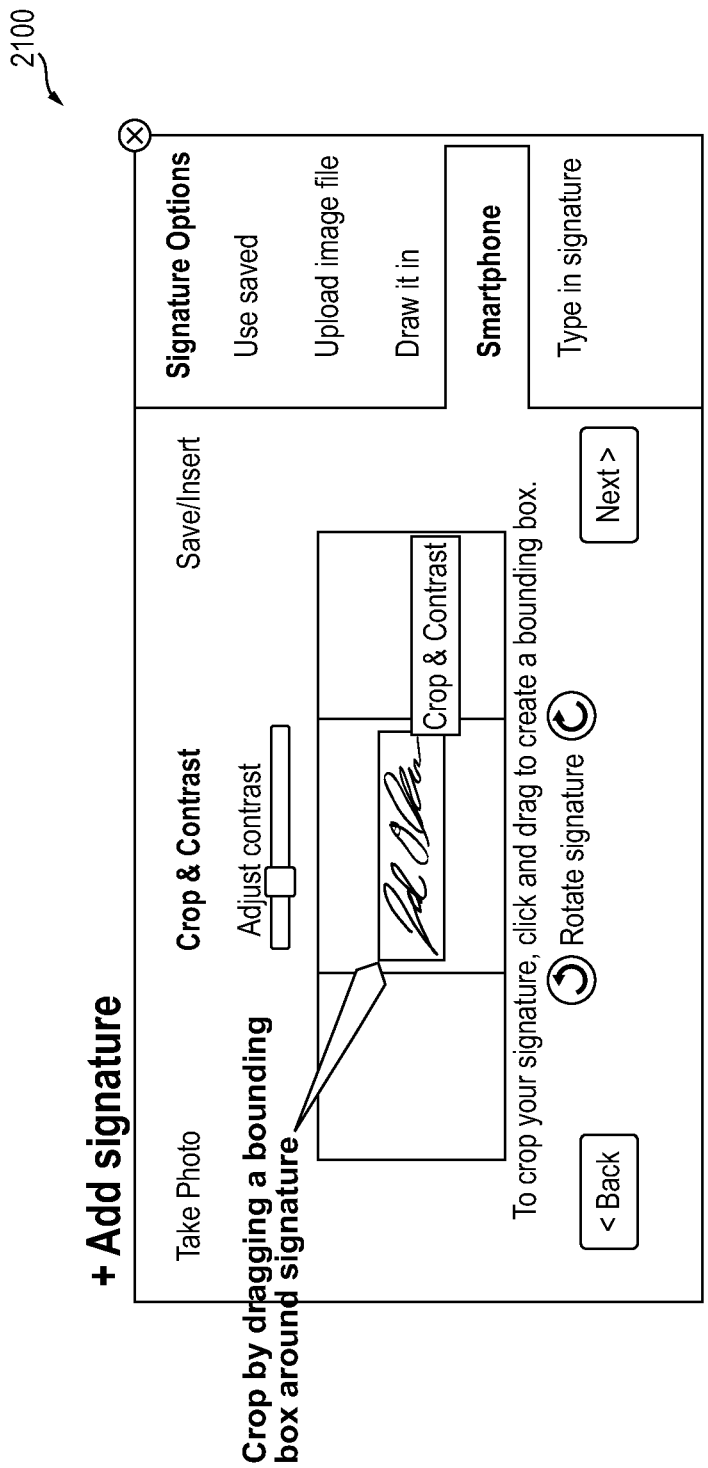
FIG. 21 is an example user interface for cropping a signature image in accordance with an embodiment of the present invention.

Once the email message has been sent, document management application 106 can receive the message and associate the message with the user (via, e.g., the unique identifier included in the subject line) (block 1610). Document management application 106 can then extract the signature image from the email message and generate one or more UIs configured to display the signature image and to provide various image manipulation functions (blocks 1612 and 1614). For example, FIGS. 20 and 21 illustrate example UIs 2000 and 2100 that enable the user to crop and adjust the contrast of the signature image. These features are useful since the user can ensure the signature image integrates well, from a visual perspective, into the electronic document, without having to edit the image in a separate editor or program.

Finally, at block 1612, document management application 106 can save the signature image for insertion into the electronic document (per FIG. 9) and/or for reuse at a later point in time.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
    receiving, by a server computer system, an electronic document from a user operating a client computing device;
    converting, by the server computer system, the electronic document into a standard image format;
    causing, by the server computer system, the converted electronic document to be displayed to the user via the client computing device;
    receiving, by the server computer system from the user, user input for adding an electronic signature to the electronic document, the receiving comprising:
        generating, by the server computer system, a unique identifier for the user;
        instructing, by the server computer system, the user to capture an image of the user's signature using a camera of a smartphone;
        instructing, by the server computer system, the user to transmit, from the smartphone, an email message to a predefined administrative email address, wherein the email message includes the image of the user's signature as an email attachment and includes the unique identifier in the email's subject line;
        receiving, by the server computer system, the email message transmitted by the user;
        associating, by the server computer system, the email message with the user based on the unique identifier included in the email's subject line;
        extracting, by the server computer system, the image of the user's signature from the email message;
        generating, by the server computer system, a user interface that presents the image of the user's signature to the user and that includes:
            a first control for cropping the image of the user's signature;
            a second control for adjusting contrast of the image of the user's signature; and
            a third control for rotating the image of the user's signature;
        receiving, by the server computer system, one or more commands from the user via manipulation of the first, second, and third controls;
        modifying, by the server computer system, the image of the user's signature based on the one or more commands; and
        saving, by the server computer system, the modified image of the user's signature as the electronic signature;
    generating, by the server computer system, an annotated version of the electronic document that includes the electronic signature; and
    sending, by the server computer system, the annotated version of the electronic document to a recipient designated by the user.

2. The method of claim 1 further comprising:
    receiving user input for adding a checkmark or a text string to the electronic document; and
    adding the checkmark or the text string to the annotated version of the electronic document.

3. The method of claim 1 wherein the annotated version of the electronic document is sent in a facsimile format to a fax number of the recipient.

4. The method of claim 1 wherein the annotated version of the electronic document is sent in an email format to an email address of the recipient.

5. The method of claim 1 further comprising, prior to receiving the user input, presenting a user interface for selecting an annotation type to be added to the electronic document.

6. The method of claim 1 further comprising, prior to sending the annotated version of the electronic document, receiving user input for positioning the electronic signature within the annotated version of the electronic document.

7. The method of claim 1 further comprising, prior to sending the annotated version of the electronic document, receiving user input for sizing the electronic signature.

8. The method of claim 1 further comprising, prior to receiving the user input for adding the electronic signature to the electronic document, generating a user interface that provides the user a plurality of options for entering the electronic signature.

9. The method of claim 8 wherein the plurality of options for entering the electronic signature includes an option for drawing the electronic signature via a pointing device of the client computing device.

10. The method of claim 8 wherein the plurality of options for entering the electronic signature includes an option for uploading a signature image from the client computing device.

11. The method of claim 8 wherein the plurality of options for entering the electronic signature includes an option for retrieving a signature image previously associated with the user.

12. The method of claim 8 wherein the plurality of options for entering the electronic signature includes an option for capturing and submitting a signature image via the smartphone.

13. The method of claim 1 wherein the receiving, generating, and sending are performed by a web application running on the server computer system.

14. A system comprising:
    a processor; and
    a non-transitory computer readable medium having stored thereon instructions that, when executed by the processor, cause the processor to:
        receive, from a user operating a client computing device, an electronic document;
        convert the electronic document into a standard image format;

cause the converted electronic document to be displayed to the user via the client computing device;

receive, from the user, user input for adding an electronic signature to the electronic document, the receiving comprising:

generating a unique identifier for the user;

instructing the user to capture an image of the user's signature using a camera of a smartphone;

instructing the user to transmit, from the smartphone, an email message to a predefined administrative email address, wherein the email message includes the image of the user's signature as an email attachment and includes the unique identifier in the email's subject line;

receiving the email message transmitted by the user;

associating the email message with the user based on the unique identifier included in the email's subject line;

extracting the image of the user's signature from the email message;

generating a user interface that presents the image of the user's signature to the user and that includes:

a first control for cropping the image of the user's signature;

a second control for adjusting contrast of the image of the user's signature; and a third control for rotating the image of the user's signature;

receiving one or more commands from the user via manipulation of the first, second, and third controls;

modifying the image of the user's signature based on the one or more commands; and saving the modified image of the user's signature as the electronic signature;

generate an annotated version of the electronic document that includes the electronic signature; and send the annotated version of the electronic document to a recipient designated by the user.

15. The system of claim 14 wherein the processor is further configured to:

receive user input for adding a checkmark or a text string to the electronic document; and add the checkmark or the text string to the annotated version of the electronic document.

16. A non-transitory computer-readable storage medium having stored thereon program code executable by a processor, the program code comprising:

code that causes the processor to receive, from a user operating a client computing device, an electronic document;

code that causes the processor to convert the electronic document into a standard image format;

code that causes the processor to send the converted electronic document to the client computing device for display to the user via the client computing device;

code that causes the processor to receive, from the user, user input for adding an electronic signature to the electronic document, the receiving comprising:

generating a unique identifier for the user;

instructing the user to capture an image of the user's signature using a camera of a smartphone;

instructing the user to transmit, from the smartphone, an email message to a predefined administrative email address, wherein the email message includes the image of the user's signature as an email attachment and includes the unique identifier in the email's subject line;

receiving the email message transmitted by the user;

associating the email message with the user based on the unique identifier included in the email's subject line;

extracting the image of the user's signature from the email message;

generating a user interface that presents the image of the user's signature to the user and that includes:

a first control for cropping the image of the user's signature;

a second control for adjusting contrast of the image of the user's signature; and a third control for rotating the image of the user's signature;

receiving one or more commands from the user via manipulation of the first, second, and third controls;

modifying the image of the user's signature based on the one or more commands; and saving the modified image of the user's signature as the electronic signature;

code that causes the processor to generate an annotated version of the electronic document that includes the electronic signature; and code that causes the processor to send the annotated version of the electronic document to a recipient designated by the user.

17. The non-transitory computer-readable storage medium of claim 16 wherein the one or more electronic annotations include a text string, a checkmark, and an electronic signature program code further comprises:

code that causes the processor to receive user input for adding a checkmark or a text string to the electronic document; and code that causes the processor to add the checkmark or the text string to the annotated version of the electronic document.

* * * * *